(12) United States Patent
Nakamura

(10) Patent No.: US 8,261,794 B2
(45) Date of Patent: Sep. 11, 2012

(54) PNEUMATIC TIRE

(75) Inventor: Norihiko Nakamura, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 579 days.

(21) Appl. No.: 12/255,705

(22) Filed: Oct. 22, 2008

(65) Prior Publication Data

US 2009/0107595 A1    Apr. 30, 2009

(30) Foreign Application Priority Data

Oct. 25, 2007    (JP) .................................. 2007-277277

(51) Int. Cl.
*B60C 1/00*    (2006.01)

(52) U.S. Cl. .................... 152/525; 152/152.1; 152/209.5

(58) Field of Classification Search ............... 152/152.1, 152/525, 209.5
See application file for complete search history.

(56) References Cited

U.S. PATENT DOCUMENTS

| | | | | |
|---|---|---|---|---|
| 2,650,641 | A * | 9/1953 | Hiatt et al. ..................... | 156/122 |
| 4,642,202 | A * | 2/1987 | Railsback ...................... | 252/511 |
| 4,914,147 | A * | 4/1990 | Mouri et al. ................... | 524/495 |
| 5,430,087 | A * | 7/1995 | Carlson et al. ................. | 524/496 |
| 5,518,055 | A * | 5/1996 | Teeple et al. ................ | 152/152.1 |
| 5,872,171 | A * | 2/1999 | Detrano ......................... | 524/492 |
| 6,057,397 | A | 5/2000 | Takagishi et al. | |
| 6,140,407 | A | 10/2000 | Akutagawa et al. | |
| 6,140,450 | A * | 10/2000 | Ishikawa et al. ................ | 528/25 |
| 6,183,581 | B1 | 2/2001 | Ducci et al. | |
| 6,191,206 | B1 * | 2/2001 | Detrano ......................... | 524/492 |
| 6,228,929 | B1 * | 5/2001 | Larson et al. .................. | 524/495 |
| 6,415,833 | B1 | 7/2002 | Komatsu | |
| 6,602,942 | B1 * | 8/2003 | Karato .......................... | 524/474 |

(Continued)

FOREIGN PATENT DOCUMENTS

EP    0 705 722    4/1996

(Continued)

OTHER PUBLICATIONS

Final Office Action for U.S. Appl. No. 12/256,532 dated Dec. 8, 2011.

(Continued)

*Primary Examiner* — Joseph Del Sole
*Assistant Examiner* — David N Brown, II
(74) *Attorney, Agent, or Firm* — Fish & Richardson P.C.

(57) ABSTRACT

A pneumatic tire that can maintain processability and tire performance such as rolling resistance or a wet performance, overcome the problem of non-conductivity by a tread rubber of silica formulation or the like, and sustain conductive performance of a tire over a long period of time is provided. The pneumatic tire includes a non-conductive tread, and a continuous conducting path comprising a conductive rim strip and a side wall, a cement rubber being applied to a ground region of the tread and a contact region between the tread and the side wall to form a continuous coating film, wherein the cement rubber includes a rubber composition comprising 100 parts by weight of a rubber component containing from 50 to 100 parts by weight of a diene rubber having a weight average molecular weight (Mw) of from 250,000 to 450,000, and from 10 to 30 parts by weight of carbon black having a nitrogen adsorption specific surface area ($N_2SA$) of from 700 to 1,300 $m^2/g$ and a dibutyl phthalate (DBP) absorption of from 300 to 550 $cm^3/100$ g, the rubber composition being dissolved in an organic solvent.

5 Claims, 4 Drawing Sheets

U.S. PATENT DOCUMENTS

| | | |
|---|---|---|
| 7,029,544 B2 * | 4/2006 | Lanzarotta et al. ........ 156/110.1 |
| 7,220,795 B2 * | 5/2007 | Miyoshi et al. ............... 524/495 |
| 2002/0112799 A1 | 8/2002 | Hiruma et al. |
| 2004/0067380 A1 * | 4/2004 | Maeda et al. ................. 428/500 |
| 2006/0020077 A1 * | 1/2006 | Miyoshi et al. ............... 524/495 |
| 2006/0102264 A1 * | 5/2006 | Nicolas ...................... 152/152.1 |
| 2007/0000585 A1 | 1/2007 | Uchida et al. |
| 2007/0007495 A1 * | 1/2007 | Hayes ........................... 252/500 |
| 2008/0103246 A1 * | 5/2008 | Nakamura .................... 524/547 |
| 2008/0223494 A1 | 9/2008 | Amino et al. |
| 2008/0308203 A1 | 12/2008 | Kunisawa et al. |
| 2009/0114321 A1 | 5/2009 | Nakamura |
| 2009/0126844 A1 | 5/2009 | Nakamura |

FOREIGN PATENT DOCUMENTS

| | | |
|---|---|---|
| EP | 0 819 741 | 1/1998 |
| JP | 10081110 | 3/1998 |
| JP | 2002-001834 | 1/2002 |
| JP | 2005-002206 | 1/2005 |

OTHER PUBLICATIONS

Barbin, W.W. and Rodgers, M.B., Science and Technology of Rubber, Second Ed., Academic Press (1994) (8 pages).
Office Action for U.S. Appl. No. 12/256,532 dated Jun. 9, 2011.
Office Action for U.S. Appl. No. 12/269,114 dated Jun. 21, 2011.
Final Office Action for U.S. Appl. No. 12/269,114 dated Oct. 24, 2011.

* cited by examiner

PNEUMATIC TIRE

CROSS-REFERENCE TO RELATED APPLICATIONS

This application is based upon and claims the benefit of priority from the prior Japanese Patent Application No. 2007-277277, filed on Oct. 25, 2007; the entire contents of which are incorporated herein by reference.

BACKGROUND

The present invention relates to a pneumatic tire. More particularly, it relates to a pneumatic tire having excellent conductivity that has a tread of silica formulation or the like, improves rolling resistance and wet performance of a tire and can discharge static electricity charged in vehicles through a road surface.

To improve rolling resistance of a pneumatic tire and running performance (wet performance) on wet pavement, a technique of compounding silica in place of the conventional carbon black as a reinforcing agent with a rubber composition of a tread. With this silica compounding technique, discharge phenomenon occurs by static electricity charged in vehicles when a tire passes on a manhole or the like, and this gives rise to the problems of radio noise, adverse influence to electronic circuit parts, generation of short-circuit and the like.

To overcome those problems, various techniques of ensuring conductivity of a tire by providing a conductive member having compounded therewith carbon black on a part of a tread structure have conventionally been proposed. For example, the technique disclosed in JP-A-2002-1834 (kokai) (the entire contents of this reference being incorporated herein by reference) is to form a conductive thin film containing carbon black on an outer surface of a tread and a side wall by applying a conductive liquid rubber paste composition to an area of from the vicinity of the part corresponding to the ground end of a tread of a green tire to the part corresponding to a buttress, vulcanizing and molding, thereby covering the entire groove surface of transverse grooves at a tire shoulder.

The technique described in EP 0 819 741 A1 (the entire contents of this reference being incorporated herein by reference) is to form a continuous coating film by applying a rubber cement obtained by dissolving and uniformly dispersing a rubber composition comprising 100 parts by weight of a diene rubber and from 40 to 100 parts by weight of carbon black having an $N_2SA$ of 130 $m^2/g$ or more and a DBP absorption of 110 ml/100 g or more in an organic solvent, to an outer surface of a tire tread cap rubber having an intrinsic resistance value of $10^8$ Ω·cm or more and a part of at least one member adjacent to the outer surface.

The technique described in EP 0 705 722 A1 (the entire contents of this reference being incorporated herein by reference) is to have a carbon black-reinforced carcass and a rubber tread quantitatively reinforced with silica, the tread having thereon a protective thin coating film containing a given amount of an electrically conductive carbon black.

U.S. Pat. No. 6,140,407 (the entire contents of this reference being incorporated herein by reference) describes that an aqueous conductive coating containing a rubber component, carbon black having a nitrogen absorption method specific surface area ($N_2SA$) of from 70 to 180 $m^2/g$ and a dibutyl phthalate (DBP) absorption of from 70 to 180 ml/100 g, and a surfactant is applied over the surface of a tread constituted of a rubber composition having high electric resistance and the surface of a side wall constituted of a rubber composition having low electric resistance adjacent to the tread.

JP-A-2005-2206 (kokai) (the entire contents of this reference being incorporated herein by reference) describes a rubber composition comprising a rubber component containing a diene rubber, having compounded therewith a carbon black component containing a highly conductive carbon black or acetylene black having a specified specific surface area, and other carbon black, the rubber composition after vulcanization having a loss tangent (tan δ) of from 0.03 to 0.07 at 60° C. and a volume resistivity of from $10^4$ to $10^6$ Ω·cm at 25° C., thereby providing a pneumatic tire having both low rolling resistance and high antistatic property.

However, the techniques described in the above references do not reach to overcome the improvement of low rolling resistance and wet performance by compounding a non-conductive filler such as silica and the problem of non-conductivity of a tire based on a non-conductive tread, in combination. In other words, even though conductivity was improved by providing a conductive thin film comprising a diene rubber containing carbon black having a large specific surface area on the surface of a tire, where carbon black having a large specific area is contained in an amount of 40 parts by weight or more, there were the problems such that the rubber composition becomes highly exothermic, and satisfactory low rolling resistance cannot be achieved; unvulcanization viscosity is increased due to the decrease of dispersibility of carbon black, and this adversely affects processability in production process; and rubber strength of a conductive thin film is decreased with tire running, and conductive performance cannot be sustained over a long period of time.

SUMMARY

In view of the problems, according to the aspect of the present invention, there is provided a pneumatic tire that can maintain processability of a rubber and tire performance such as rolling resistance or a wet performance of a tire, overcome the problem of non-conductivity by a tread rubber of silica formulation or the like, and sustain conductive performance of a tire over a long period of time.

The pneumatic tire according to the aspect of the present invention comprises a tread forming a ground surface comprising a non-conductive rubber composition, and a conducting path comprising a conductive rubber composition, contacting the tread and continuously formed over a rim contact region of a tire, a cement rubber being applied to an outer surface of a tire including a ground region of the tread and a contact region between the tread and the conducting path to form a continuous coating film of the cement rubber, wherein the cement rubber comprises a rubber composition comprising 100 parts by weight of a rubber component containing from 50 to 100 parts by weight of a diene rubber having a weight average molecular weight (Mw) of from 250,000 to 450,000; and from 10 to 30 parts by weight of carbon black having a nitrogen adsorption specific surface area ($N_2SA$) of from 700 to 1,300 $m^2/g$ and a dibutyl phthalate (DBP) absorption of from 300 to 550 $cm^3/100$ g, the rubber composition being dissolved in an organic solvent.

In the aspect of the invention, the total amount of the carbon black contained in the rubber composition for the cement rubber is preferably from 50 to 90 parts by weight per 100 parts by weight of the rubber component.

Also, the rubber composition for the cement rubber may have electric resistivity of less than $10^7$ Ω·cm.

According to the aspect of the present invention, processability of a rubber and tire performance such as rolling resistance or wet performance of a tire by silica formulation are maintained, and additionally conductive performance of a tire can be sustained over a long period of time. Furthermore, problems such as noise, adverse influence to electronic parts or short circuit, due to static electricity charged in vehicles using a non-conductive tire of a silica-formulated tread or the like, can be eliminated.

DETAILED DESCRIPTION

The embodiments of the present invention are described below. The embodiments are described on the basis of an example of a tire for a passenger car, but the invention is not limited thereto.

Figure 1:
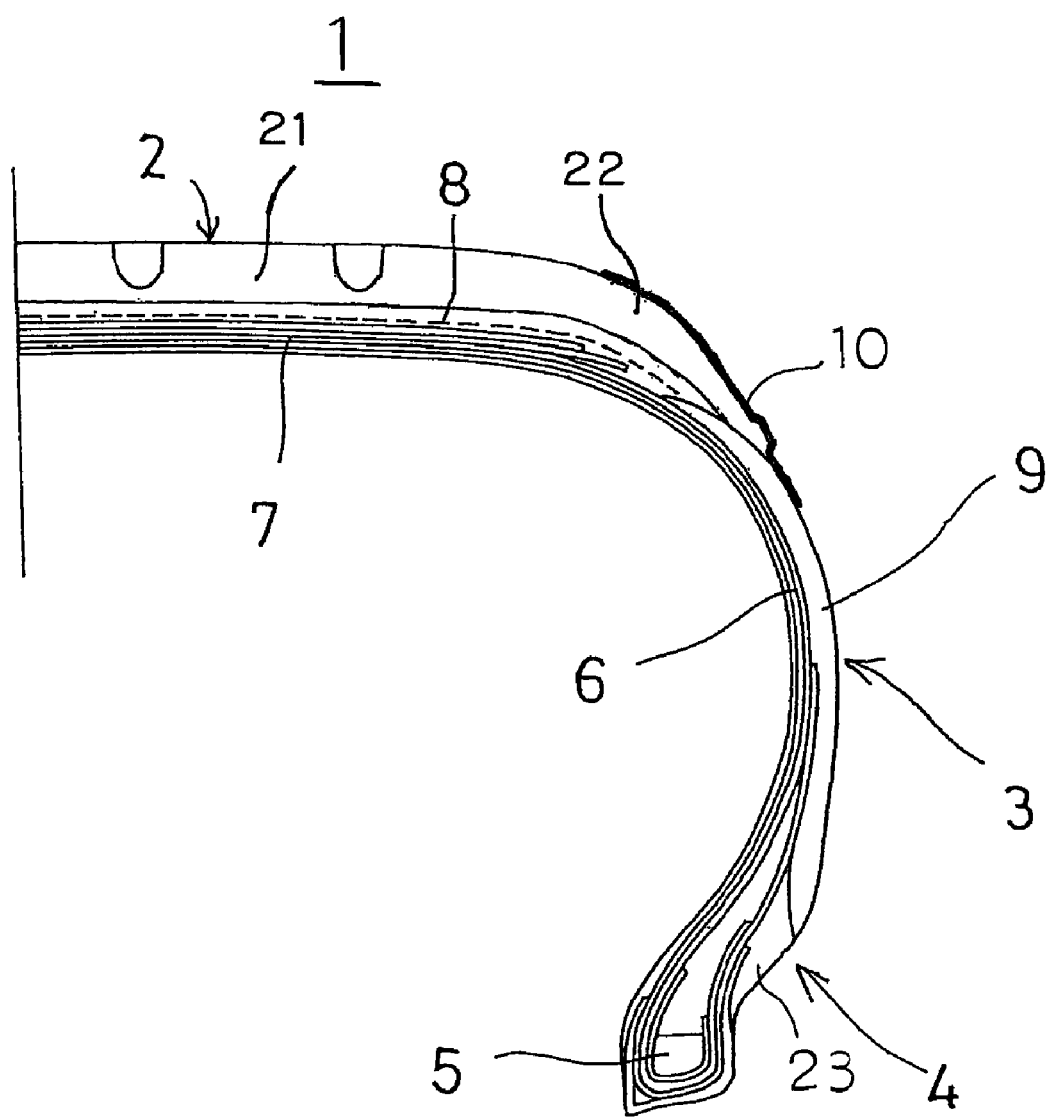
FIG. 1 is a half sectional view of a pneumatic tire according to the embodiments.

FIG. 1 is a half sectional view of a pneumatic tire 1 according to the embodiment.

The pneumatic tire 1 (hereinafter simply referred to as a "tire") is constituted of a pair of beads 4 to be mounted on a rim, a side wall 3 extending outwardly in a radial direction of a tire from the bead 4, and a tread 2 grounded to a road surface, provided between the side walls 3, 3. The tread 2 comprises a crown 21 constituting a main ground part at a central part in a width direction of a tire, and a shoulder 22 positioned at both sides of the tread 2 to form a ground end region and following to the side wall 3.

The tire 1 is provided with a rim strip 23 contacting a flange of a rim provided on the outside of the bead 4 in an axial direction of a tire, and the lower end of a side wall rubber 9 is superposed on and contacted with the end of the rim strip 23.

As shown in FIG. 1, the tire 1 has a tread over side wall (TOS) structure that an outer end of the side wall rubber 9 in a radial direction of a tire is superposed on the lower side of the end of the tread shoulder 22. In other words, the surface of both circumferential parts of the tread shoulder 22 covers both outer ends of the side wall 3 on the circumference of a tire to form a tread ground end region.

Furthermore, the tire 1 shows a tire having a general radial structure for a passenger car, comprising a carcass 6 comprising two carcass plies comprising a cord provided around a bead core 5 embedded in a pair of beads 4, respectively, in a radial direction, the carcass ply being turned outwardly from the inside of a tire and locked, a belt 7 comprising two crossed belt plies provided at the inside of the tread 2, and one cap ply 8 comprising a code spirally wound on the circumference of the belt 7 at an angle of nearly 0° to a circumferential direction of a tire.

The carcass ply of the carcass 6 uses an organic fiber cord such as polyester, nylon or rayon. The belt ply of the belt 7 uses a rigid cord such as a steel cord or an aramide fiber. The cap ply 8 uses a cord having relatively large heat shrinkability, such as nylon or a polyester, as a reinforcing member.

The tread rubber constituting the tread 2 uses a rubber composition comprising, as a reinforcing agent, non-carbon black reinforcing agent such as silica (for example, precipitated silica, anhydrous silicic acid), clay (for example, calcined clay, hard clay), calcium carbonate or the like, in place of the conventional carbon black so as to decrease tan δ of the rubber composition in order to contribute to the improvement of rolling resistance and wet performance of the tire 1. In particular, silica having large improvement effect such as rolling resistance is preferably used.

The compounding amount of the non-carbon black reinforcing agent such as silica is from 30 to 120 parts by weight, and preferably from 40 to 100 parts by weight, per 100 parts by weight of the rubber component. Rolling resistance and wet performance can be improved by the compounding amount.

In the case of silica, the kind of silica is not particularly limited. For example, wet silica having a nitrogen adsorption specific surface area (BET) of from 100 to 250 m$^2$/g and a DBP absorption of 100 ml/100 g or more is preferred from the points of reinforcing effect and processability. Commercially available products such as NIPSIL AQ, manufactured by Tosoh Silica Corporation or ULTRASIL VN3, manufactured by Degussa can be used. Furthermore, co-use of a silane coupling agent such as bis(triethoxysilylpropyl)tetrasulfide is preferred.

From the standpoints of abrasion resistance and heat build-up, SAF, ISAF, HAF and the like are preferred as carbon black in a tread rubber, and its compounding amount is from about 0 to 40 parts by weight per 100 parts by weight of the rubber component.

As the rubber component in the tread rubber, diene rubbers such as a natural rubber (NR), an isoprene rubber (IR), a styrene-butadiene rubber (SBR) or a butadiene rubber (BR) are used alone or as a blend of two or more thereof. Furthermore, oils, softeners such as a wax, stearic acid, zinc white, resins, age resisters, vulcanizing agents such as sulfur, vulcanization accelerators or the like that are compounding ingredients for a rubber are appropriately compounded.

By this, the tread rubber becomes a rubber improving rolling resistance and wet performance of the tire 1, but on the other hand, the rubber composition has electric resistivity of $10^8$ Ω·cm or more, and therefore forms a non-conductive rubber. As a result, the tread ground part of the tire 1 is non-conductive, and the tire 1 becomes a non-conductive tire having electric resistance of $10^8$Ω or more by the combination of each member. Therefore, even though a conductive rubber is used in the rim strip rubber 23 of the bead 4 and the side wall rubber 9 of the side wall 3, because the tread ground region is non-conductive, static electricity charged in vehicles cannot be discharged in a road surface from the tread 2 via the bead 4 and the side wall 3.

To solve the above problem of static electricity charged in vehicles, the tire 1 according to the embodiment is that a conductive rubber composition having electric resistivity of less than $10^7$ Ω·cm is applied to the side wall rubber 9 and the rim strip 23 of a tire. By this, a continuous conducting path is formed on the side wall 3 with the rim strip 23 and the side wall rubber 9.

A continuous coating film 10 obtained by coating a cement rubber comprising a rubber composition dissolved in an organic solvent is formed on the outer surface of a tire including at least a ground region of the shoulder 22 of the tread 2 and a contact region between the tread 2 and the side wall 3 in a radial direction. Specifically, the continuous coating film 10 is continuously formed from the ground end region 22 of the tread 2 to a radially outer end of the conducting path 9 on the outer surface of a tire.

In the aspect of the present invention, the rubber composition for obtaining the cement rubber comprises 100 parts by weight of a rubber component containing from 50 to 100 parts by weight of a diene rubber having a weight average molecular weight (Mw) of from 250,000 to 450,000 as a rubber component, and from 10 to 30 parts by weight of carbon black having a nitrogen adsorption specific surface area ($N_2SA$) of from 700 to 1,300 m$^2$/g and a dibutyl phthalate (DBP) absorption of from 300 to 550 cm$^3$/100 g.

Examples of the diene rubber having Mw of from 250,000 to 450,000 include a styrene-butadiene rubber (SBR) and a butadiene rubber (BR), obtained by emulsion polymerization or solution polymerization. It is preferred to contain SBR. Where Mw is less than 250,000, strength of the rubber composition is deficient, and sustainability of the coating film 10 applied to a tire deteriorates. Where Mw exceeds 450,000, viscosity of an unvulcanized rubber is increased, and as a result, mixing property is decreased and solubility in an organic solvent deteriorates. Herein, the Mw is the value measured with GPC (gel permeation chromatography), in a solvent: THF (tetrahydrofuran), and at 40° C.

Where the content of the diene rubber in the rubber component is less than 50 parts by weight, viscosity increase of the rubber composition is significant, and processability greatly deteriorates. Furthermore, rolling resistance is not improved.

Preferred examples of the rubber component other than the diene rubber having the specific Mw include a natural rubber, SBR and BR having Mw other than the above range, and a diene rubber such as a polyisoprene rubber.

Where $N_2SA$ of the carbon black is less than 700 m$^2$/g and the DBP absorption thereof is less than 300 cm$^3$/100 g, conductivity of the rubber composition deteriorates, and where the $N_2SA$ exceeds 1,300 m$^2$/g and the DBP absorption exceeds 550 cm$^3$/100 g, dispersibility of carbon black deteriorates, and it is difficult to process with the viscosity increase of an unvulcanized rubber. $N_2SA$ and DBP absorption of carbon black are values measured according to JIS K6217.

Where the compounding amount of the carbon black is less than 10 parts by weight, conductivity of the rubber composition is not obtained and is poor, and where the compounding amount exceeds 30 parts by weight, dispersibility of the carbon black deteriorates, processability deteriorates with viscosity increase of an unvulcanized rubber, and improvement of rolling resistance is not observed.

The rubber composition preferably contains carbon black other than the above carbon black. When the carbon black other than the above carbon black is co-used in the total amount of carbon black in a range of from 50 to 90 parts by weight, viscosity of an unvulcanized rubber is maintained low and processability can be improved while maintaining conductivity of the rubber composition. Furthermore, solubility in an organic solvent can be improved.

The carbon black other than the above carbon black is not particularly limited, and preferred examples thereof include carbon blacks of HAF, FEF and GPF grades, having relatively large particle diameter.

Oils, softeners such as a wax, stearic acid, zinc white, resins, age resisters, vulcanizing agents such as sulfur, vulcanization accelerators and the like that are compounding ingredients for a rubber are appropriately compounded with the rubber composition.

Electric resistivity of the rubber composition by the above constitution is less than 10$^7$ Ω·cm. Due to this, the continuous coating film 10 obtained by coating the cement rubber comprising the rubber composition dissolved in an organic solvent has conductivity. This forms a conducting path continuing from the bead 4 to a ground region of the tread 2, and as a result, electric resistance of a tire is reduced, and static electricity of vehicles is discharged in a road surface from the tread 2 through the conducting path.

The cement rubber is obtained by dissolving and uniformly dispersing the rubber composition in an organic solvent. The organic solvent is not limited so long as it has dissolution ability to the rubber composition. Examples of the organic solvent used include a volatile oil for rubber, hexane, petroleum ether, heptane, tetrahydrofuran (THF) and cyclohexane. Of those, a volatile oil for rubber and hexane are preferably used. The rubber composition is dissolved in the organic solvent to obtain a rubber cement, and the cement rubber is then applied to a tire.

The coating film 10 can be formed by applying the cement rubber to the outer surface of an unvulcanized tire and then vulcanizing the cement rubber by the conventional tire vulcanization. Alternatively, the coating film 10 can be formed by directly applying the cement rubber to the outer surface of a vulcanized tire and then drying the cement rubber. The application method of the cement rubber can use the general application methods of liquid paint, such as brush coating, roller coating or spray coating.

The coating thickness of the continuous coating film 10 is not particularly limited, but is from about 10 to 500 μm, and preferably from 20 to 300 μm. The coating film 10 may be a film continuous in a circumferential direction of a tire, or may be a discontinuous film. Furthermore, the coating film 10 may be formed on only one side of a tire.

Where the thickness of the coating film 10 exceeds 500 μm, peel phenomenon is liable to occur due to difference in physical properties to a tread rubber, and it is difficult to stably maintain electric resistance value up to the end stage of tire running. On the other hand, where the thickness is less than 10 μm, formation of a conducting path is not sufficient.

The tire 1 has the conducting pass as a path, and static electricity charged in vehicles is passed through the rim strip rubber 23 and the side wall rubber 9 from the rim and then discharged in a road surface from the coating film 10 extended in a grounded region.

The rim strip 23 and the side wall rubber 9, having conductivity comprise a rubber composition containing, as a rubber component, a diene rubber such as NR, IR, SBR, BR or a butadiene rubber (VCR) containing syndiotactic-1,2-polybutadiene, alone or as blends thereof, and 20 parts by weight or more, and preferably 30 parts by weight or more of carbon black having $N_2SA$ of from 25 to 100 m$^2$/g. A rubber composition having electric resistivity of less than 10$^7$ Ω·cm is used.

Figure 3:
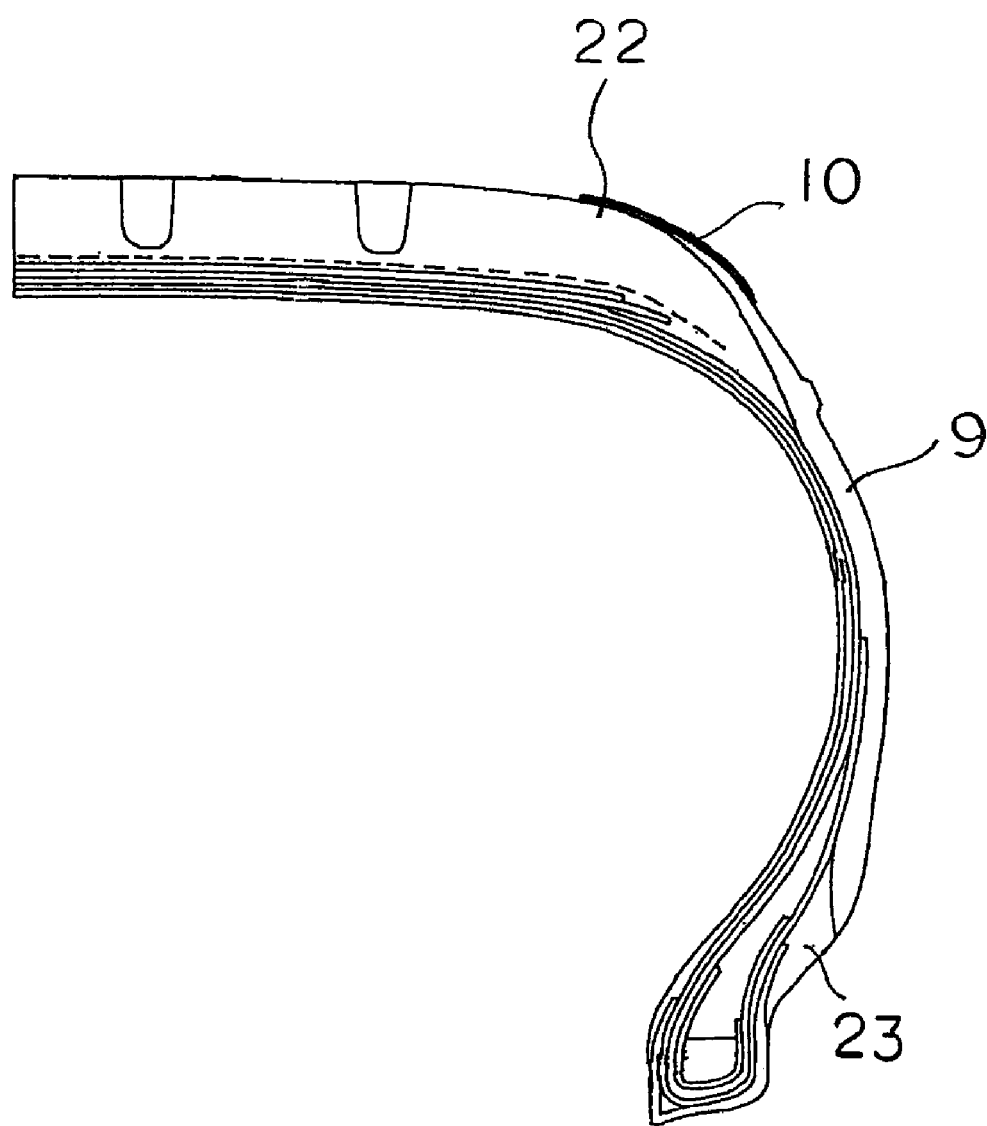
FIG. 3 is a half sectional view of a pneumatic tire having SWOT structure.
Figure 4:
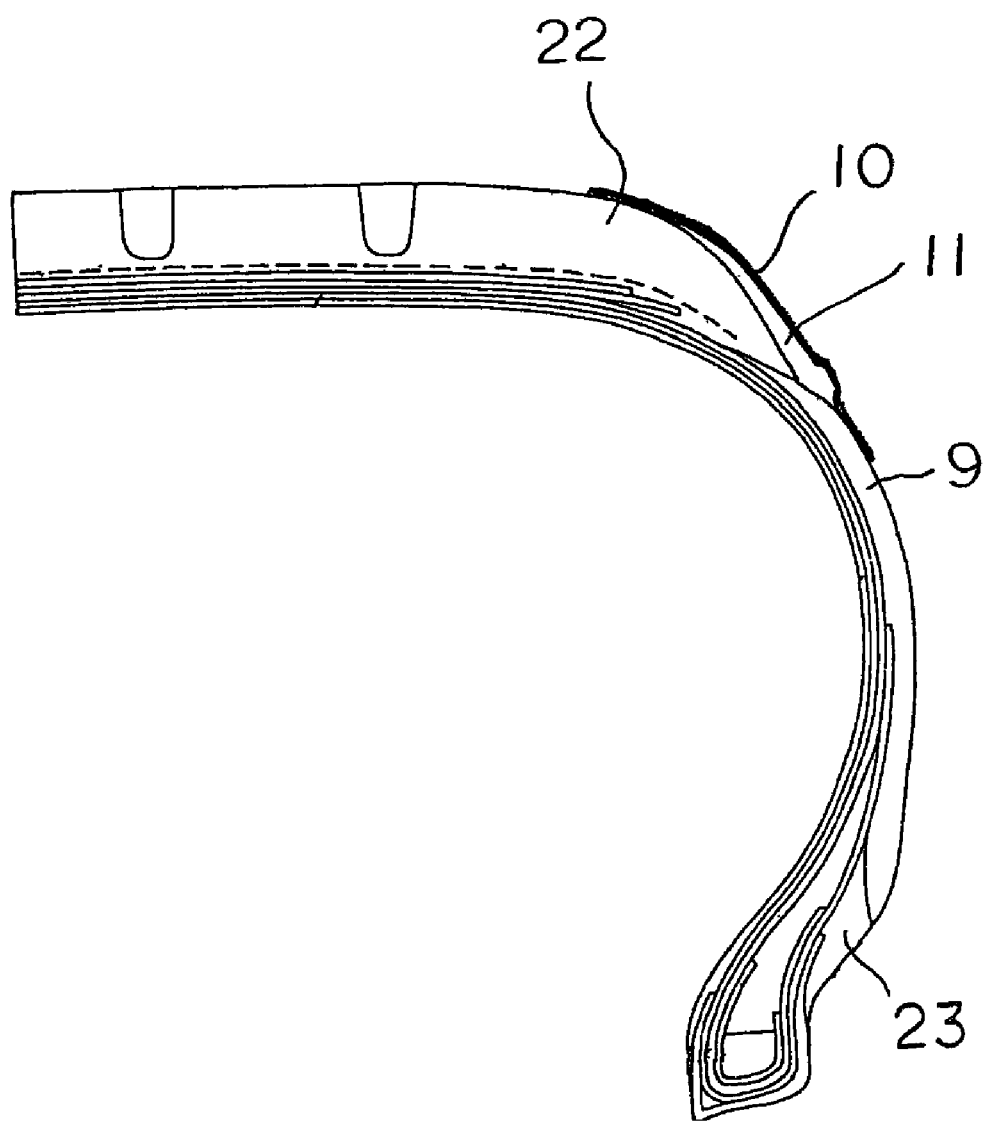
FIG. 4 is a half sectional view of a pneumatic tire having a wing rubber.

The pneumatic tire according to the embodiment of the present invention is not limited to the tire having TOS structure shown in FIG. 1. The continuous coating film 10 can be formed to a tire having a so-called side wall on tread (SWOT) structure in which an outer end of the side wall rubber 9 in a radial direction of a tire is superposed on the upper side of a ground end region of the tread shoulder 22 as shown in FIG. 3, a tire having a wing rubber 11 in a ground edge region as shown in FIG. 4, and a tire having a so-called cap/base structure in which the tread is constituted of a two-layer structure. Thus, conductivity can be imparted to a non-conductive tire.

EXAMPLES

The present invention is specifically described below by the following embodiment, but the invention is not limited to this embodiment.

Each rubber composition for a rim strip, a side wall and a tread was prepared by kneading a mixture according to the formulation (parts by weight) described in Table 1 using Banbury mixer having a volume of 200 liters by the conventional method. Electric resistivity of each rubber composition is shown in Table 1.

Next, a rubber composition for a cement rubber was prepared by kneading a mixture according to the formulation (parts by weight) described in Table 2 using Banbury mixer having a volume of 200 liters by the conventional method. Processability (Mooney viscosity) and electric resistivity of the rubber composition are measured and shown in Table 2. A rubber component, carbon black and a compounding ingredient used are as follows.

Rubber Component

Natural rubber (NR): RSS#3, made in Thailand

Butadiene rubber (BR): BR150B, manufactured by Ube Industries, Ltd.

Styrene-butadiene rubber 1 (SBR-1): 1723, Mw: 850,000, manufactured by JSR Corporation Styrene-butadiene rubber 2 (SBR-2): 1502, Mw: 420,000, manufactured by JSR Corporation Styrene-butadiene rubber 3 (SBR-3): 1507, Mw: 300,000, manufactured by JSR Corporation Carbon Black Carbon black HAF for rim strip rubber: SEAST 3, manufactured by Tokai Carbon Co., Ltd.

Carbon black FEF for side wall rubber: SEAST SO, manufactured by Tokai Carbon Co., Ltd.

Carbon black ISAF for tread rubber: SEAST 6, manufactured by Tokai Carbon Co., Ltd.

Carbon black 1 for cement rubber (CB-1): SEAST KH, $N_2SA$: 90 $m^2/g$, DBP absorption: 120 $cm^3/100$ g, manufactured by Tokai Carbon Co., Ltd.

Carbon black 2 for cement rubber (CB-2): KETJEN BLACK EC300J, $N_2SA$: 800 $m^2/g$, DBP absorption: 360 $cm^3/100$ g, manufactured by Ketjen Black International Co.

Carbon black 3 for cement rubber (CB-3): KETJEN BLACK EC600JD, $N_2SA$: 1,270 $m^2/g$, DBP absorption: 500 $cm^3/100$ g, manufactured by Ketjen Black International Co.

Compounding Ingredient

Silica: NIPSIL AQ, manufactured by Tosoh Silica Corporation

Silane coupling agent: Si69, manufactured by Degussa

Aroma oil: X-140, manufactured by Japan Energy Corporation

Paraffin wax: OZOACE 0355, manufactured by Nippon Seiro Co., Ltd.

Age resister 6C: NOCLAC 6C, manufactured by Ouchi Shinko Chemical Industrial Co., Ltd.

Stearic acid: RUNAX S-20, manufactured by Kao Corporation

Zinc oxide: Zinc White #1, manufactured by Mitsui Mining & Smelting Co., Ltd.

Sulfur: 5% oil-treated powdery sulfur, manufactured by Hosoi Chemical Industry Co., Ltd.

Vulcanization accelerator NS: NOCCELLAR NS-P, manufactured by Ouchi Shinko Chemical Industrial Co., Ltd.

TABLE 1

| | | Rim strip Conductive | Side wall Conductive | Tread rubber Nonconductive |
|---|---|---|---|---|
| Formulation | NR | 70 | 40 | 50 |
| | BR | 30 | 60 | |
| | SBR-2 | | | 50 |
| | Carbon black | 70 | 50 | |
| | Silica | | | 60 |
| | Silane coupling agent | | | 4 |
| | Aroma oil | 3 | 10 | 20 |
| | Wax | 1 | 1 | 3 |
| | Age resister | 2 | 2 | 2 |
| | Stearic acid | 2 | 2 | 2 |
| | Zinc oxide | 3 | 3 | 3 |
| | Sulfur | 2 | 2 | 2 |
| | Vulcanization accelerator | 1.5 | 1.5 | 1.5 |
| | Electric resistivity ($\Omega \cdot cm$) | $10^6$ | $10^6$ | $10^{13}$ |

The rubber composition for cement and hexane were mixed in a weight ratio of 5:95, stirred and dissolved to prepare a cement rubber. The cement rubber was applied to an unvulcanized tire having a general structure of a size of 195/65R15 on an area of from the tread ground region to the side wall in a thickness of 40 μm, and vulcanized and molded by the conventional method to prepare a test tire. Rolling resistance of each tire and electric resistance after running a real car a distance of 1,000 km and a distance of 30,000 km were measured with the following methods. The results obtained are shown in Table 2.

Processability (Mooney Viscosity)

Mooney viscosity is $ML_{1+4}$ measured at 100° C. according to JIS K6300. The processability was indicated by an index as Comparative Example 1 being 100. The processability is good as the value is small.

Electric Resistivity of Rubber Composition

The electric resistivity is a value measured according to JIS K6911. The measurement conditions are that voltage applied is 1,000 V, temperature is 25° C. and humidity is 50%.

Rolling Resistance

A tire was mounted on a rim of 15×6-JJ with air pressure of 200 kPa, and using a uniaxial drum tester for the measurement of rolling resistance, rolling resistance under a load of 4 kN at 60 km/hr was measured. The rolling resistance is indicated by an index as Comparative Example 1 being 100. Rolling resistance is high and fuel consumption is poor as the value is large.

Electric Resistance of Tire

Figure 2:
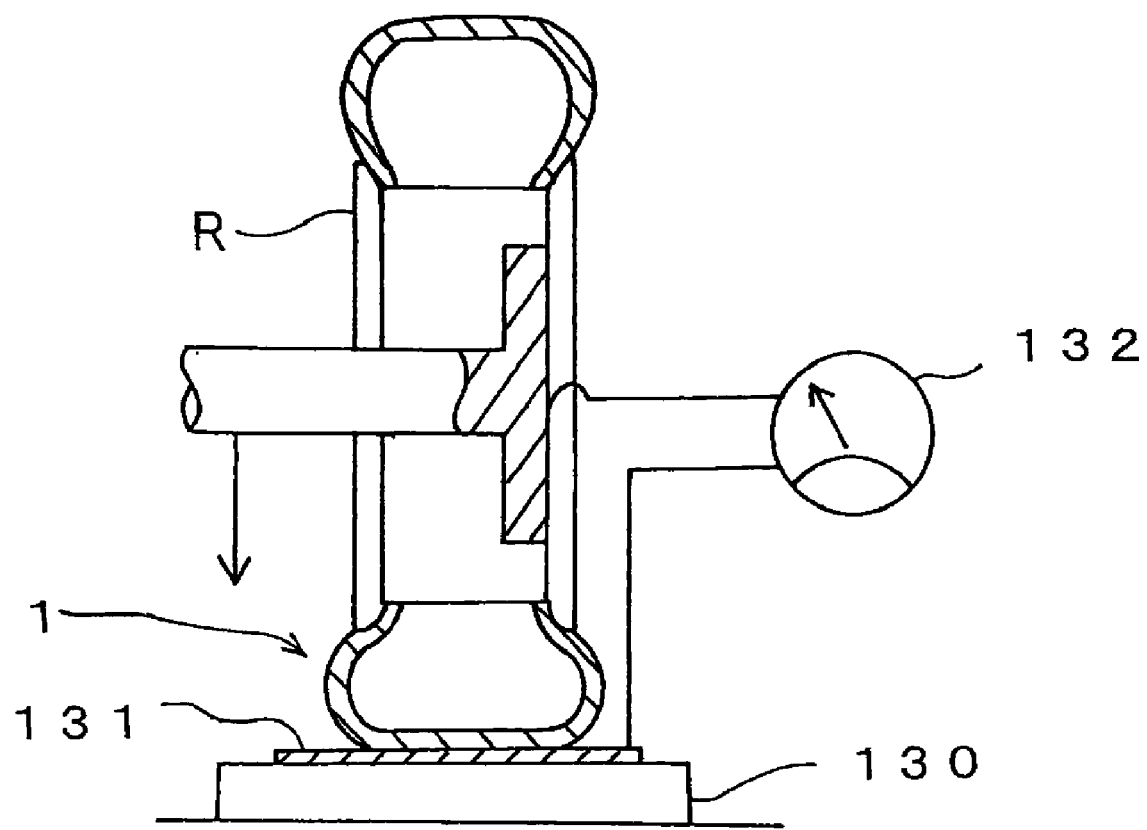
FIG. 2 is a schematic view showing a measurement method of electric resistance of a tire.

A tire was mounted on a rim of 15×6-JJ with air pressure of 200 kPa, and used in a front-wheel-drive domestic car. After running 1,000 km and after running 30,000 km, electric resistance was measured based on "Measurement Procedures of Electric Resistance of Tire under Load" defined in WDK, Blatt 3 (Germany). That is, as shown in FIG. 2, the tire 1 mounted on a rim was vertically ground under a load of 4 kN on a copper plate 131 provided in an insulating state to a bedplate 130, and electric resistance between the central portion of a rim R and the copper plate 131 was measured using a resistance measuring instrument 132 by applying an applied voltage of 1,000 V. At the time of measurement, temperature was 25° C., and humidity was 50%.

TABLE 2

| | | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|---|
| Formulation | SBR-1 | 40 | 40 | 40 | 40 | 100 | 100 | 40 | 40 | 40 |
| | SBR-2 | 60 | | | | | | | | |
| | SBR-3 | | 60 | 60 | 60 | | | 60 | 60 | 60 |
| | Carbon black-1 | 40 | 40 | 30 | 40 | 80 | | | 50 | 20 |
| | Carbon black-2 | 15 | 15 | 25 | | | 40 | 40 | 5 | 35 |
| | Carbon black-3 | | | | 15 | | | | | |
| | Aroma oil | 37.5 | 37.5 | 37.5 | 37.5 | 37.5 | 37.5 | 37.5 | 37.5 | 37.5 |
| | Wax | 2 | 2 | 2 | 2 | 2 | 2 | 2 | 2 | 2 |
| | Age resister | 2 | 2 | 2 | 2 | 2 | 2 | 2 | 2 | 2 |
| | Stearic acid | 2 | 2 | 2 | 2 | 2 | 2 | 2 | 2 | 2 |
| | Zinc oxide | 2 | 2 | 2 | 2 | 2 | 2 | 2 | 2 | 2 |
| | Sulfur | 2 | 2 | 2 | 2 | 2 | 2 | 2 | 2 | 2 |
| | Vulcanization accelerator | 1.5 | 1.5 | 1.5 | 1.5 | 1.5 | 1.5 | 1.5 | 1.5 | 1.5 |
| Result | Mooney viscosity (Index) | 100 | 80 | 95 | 90 | 100 | 160 | 110 | 70 | 115 |
| | Electric resistivity ($\Omega \cdot cm$) | $10^5$ | $10^5$ | $10^5$ | $10^5$ | $10^5$ | $10^5$ | $10^5$ | $10^{5\text{-}6}$ | $10^5$ |
| | Rolling resistance (Index) | 99 | 99 | 100 | 100 | 100 | 102 | 102 | 98 | 101 |
| | Electric resistance ($\Omega$) *1 | $10^6$ | $10^6$ | $10^6$ | $10^6$ | $10^6$ | $10^6$ | $10^6$ | $10^{6\text{-}7}$ | $10^6$ |
| | Electric resistance ($\Omega$) *2 | $10^6$ | $10^6$ | $10^6$ | $10^6$ | $10^{7\text{-}10}$ | $10^6$ | $10^6$ | $10^{9\text{-}10}$ | $10^6$ |

*1: After running 1,000 km
*2: After running 30,000 km

It is seen from Table 2 that the pneumatic tire according to the aspect of the present invention ensures conductivity of a tire while maintaining or improving processability (Mooney viscosity) and rolling resistance, and its conductive performance can stably be sustained over a long period of time.

The pneumatic tire according to the aspect of the present invention can be used in four-wheel-cars such of passenger cars or the like, and additionally various vehicles such as two-wheel vehicles such as motorcycles, three-wheel cars, buses or trucks of five-wheels or more, trailers or industrial vehicles.

What is claimed is:

1. A pneumatic tire comprising a tread forming a ground surface comprising a non-conductive rubber composition, and a conducting path comprising a conductive rubber composition, contacting the tread and continuously formed over a rim contact region of a tire,
   a cement rubber being applied to an outer surface of the tire including a ground end region of the tread and a contact region between the tread and the conducting path to form a continuous coating film of the cement rubber,
   a side wall rubber and a rim strip rubber comprise a conductive rubber composition, the side wall rubber and the rim strip rubber form the conducting path, and the continuous coating film of the cement rubber is present from the ground end region of the tread to a radially outer end region of the side wall rubber and terminates in the radially outer end region, wherein the cement rubber comprises a rubber composition comprising:
   100 parts by weight of a rubber component containing from 50 to 100 parts by weight of a diene rubber having a weight average molecular weight (Mw) of from 250,000 to 450,000, and
   from 10 to 30 parts by weight of carbon black (A) having a nitrogen adsorption specific surface area ($N_2SA$) of from 700 to 1,300 $m^2/g$ and a dibutyl phthalate (DBP) absorption of from 300 to 550 $cm^3/100$ g, and
   carbon black (B) comprising at least one carbon black selected from the group consisting of HAF, FEF and GPF grades,
   wherein the total amount of the carbon blacks (A) and (B) contained in the rubber composition is from 50 to 90 parts by weight per 100 parts by weight of the rubber composition, the rubber composition being dissolved in an organic solvent.

2. The pneumatic tire as claimed in claim 1, wherein the rubber composition for the cement rubber has electric resistivity of less than $10^7$ $\Omega \cdot cm$.

3. The pneumatic tire as claimed in claim 1, wherein the rubber composition for the side wall rubber and the rim strip rubber has an electric resistivity of less than $10^7$ $\Omega \cdot cm$.

4. The pneumatic tire as claimed in claim 1, wherein the radially outer end of the side wall rubber is superposed on the lower side of the ground end region of the tread.

5. The pneumatic tire as claimed in claim 1, wherein the radially outer end of the side wall rubber is superposed on the upper side of the ground end region of the tread.

* * * * *